(12) United States Patent
Holtzblatt et al.

(10) Patent No.: US 6,683,633 B2
(45) Date of Patent: Jan. 27, 2004

(54) METHOD AND SYSTEM FOR ACCESSING INFORMATION

(75) Inventors: Karen Holtzblatt, Sudbury, MA (US); Hugh Beyer, Greenville, NH (US); Paul Dworkin, Somerville, MA (US)

(73) Assignee: Incontext Enterprises, Inc., Concord, MA (US)

(*) Notice: Subject to any disclaimer, the term of this patent is extended or adjusted under 35 U.S.C. 154(b) by 358 days.

(21) Appl. No.: 09/811,895

(22) Filed: Mar. 19, 2001

(65) Prior Publication Data

US 2001/0038395 A1 Nov. 8, 2001

Related U.S. Application Data

(60) Provisional application No. 60/190,853, filed on Mar. 20, 2000.

(51) Int. Cl.$^7$ .................................................. G06F 3/14
(52) U.S. Cl. ........................................ 345/854; 345/835
(58) Field of Search ................................. 345/723, 726, 345/853, 854, 972, 835, 839

(56) References Cited

U.S. PATENT DOCUMENTS

| | | |
|---|---|---|
| 5,615,346 A | 3/1997 | Gerken et al. |
| 5,625,781 A | 4/1997 | Cline et al. |
| 5,630,042 A | 5/1997 | McIntosh et al. |
| 5,760,771 A | 6/1998 | Blonder et al. |
| 5,784,058 A | 7/1998 | LaStrange et al. |
| 5,809,247 A | 9/1998 | Richardson et al. |
| 5,809,250 A | 9/1998 | Kisor |
| 5,812,134 A | 9/1998 | Pooser et al. |
| 5,933,142 A | 8/1999 | LaStrange et al. |
| 5,991,780 A | 11/1999 | Rivette et al. |
| 6,009,429 A | 12/1999 | Greer et al. |
| 6,025,844 A | 2/2000 | Parsons |
| 6,049,812 A | 4/2000 | Bertram |
| 6,526,577 B1 * | 2/2003 | Knudson et al. ............ 725/40 |
| 6,570,587 B1 * | 5/2003 | Efrat et al. ................ 345/723 |

* cited by examiner

Primary Examiner—Cao Nguyen
(74) Attorney, Agent, or Firm—Lucash, Gesmer & Updegrove, LLP (57) ABSTRACT

An information accessing system and method enables users to easily navigate through and switch between multiple paths of linked pages of information stored in an information base of text, graphic, video, audio, and animation data. Linked pages of information are displayed in multiple panels on a window on the display. The system displays a navigation panel, a preview panel, a history panel and an expert path panel. The system allows users to preview different possible paths emanating from a specific page of information prior to selecting a specific path to explore.

19 Claims, 11 Drawing Sheets

Reproductive System
The body's method of replacing itself

The fetus develops in a woman's uterus after fertilization (note the vaginal canal)

The human reproductive system supports the creation of new individuals by the fusion of genes from a male and female. Reproductive structures produce sperm cells in a male and egg cells in a female, which when fused begin the development of a new human being. Other reproductive structures support the growth of a single cell into a newborn child through a process of cell division and cell differentiation.

The fetus develops from a single cell through a process of cell division called mitosis. A fetus develops through several distinct states during its development.

PREVIEW — 220

1110

[Auto Example]

Engineers collaborate on design

1. Engineers work out the design directly with the supplier they want to build it

Engineers at the car manufacturer decided what they needed for a component and met directly with one of their favorite suppliers to design it. They made preliminary drawings together. (They are building on a known, trusted relationship.)

2. Supplier's engineers work out the details of the design to be manufacturable and high quality

Engineers at the supplier organization work out details of design, ensuring they can manufacture it at a reasonable cost and high quality. They send the resulting design back to the engineers at the car manufacturer, with a quote. They make it easy for the client to agree.)

3. Engineers agree on the deal without involving purchasing and expect the purchaser to agree to it.

The engineers at the auto company call the supplier engineers and confirm the order (without involving their own purchasing department). Afterwards, they attach the supplier's own drawing to the 'demand' (purchase order), mark it urgent, and send it to their purchasing department. (Purchaser decides how to source request)

⇧ Provide deal-making environments that reveal constraints

— 210

METHOD AND SYSTEM FOR ACCESSING INFORMATION

CITATION OF PROVISIONAL APPLICATION

The present application for United States Patent is a conversion of provisional application for U.S. Patent Serial No. 60/190,853, filed on Mar. 20, 2000.

BACKGROUND OF THE INVENTION

1. Field of the Invention

The present invention relates generally to a system to navigate through web pages, and more particularly, to a navigation tool that allows a user to easily and efficiently move between different paths of linked pages using panels on a display window.

2. Background of the Invention

Browser technology provides people rapid access to a wide breadth of text, graphic, voice, and video information stored in an information base. But using browsers productively as a tool for acquiring new knowledge presents challenges for users of this technology. Users may access new content from links contained within a page of information that they are reading, each elaborating on concepts contained in this initial page of information. Browser technology, however, often leaves users lost in a sea of knowledge as they attempt to navigate through the large corpus of knowledge available to them.

An information base, consisting of linked pages of information, contains a large number of potential paths, through which a user can navigate. Browsers, however, do not provide users any guidance on how to proceed through this large body of information or on how to easily and efficiently move between different paths through the information base. Consider the problems faced by a user of conventional browser technology. Suppose a page that a user is reading contains five links to other pages of information. The user may begin by selecting one of these links and then further explore links extending from this first link. Each link they select overwrites the content of the previous link in the browser window. Therefore when a user wishes to explore other links from the initial page of information, he must backtrack through already accessed links to the initial page. This process would need to be repeated as they navigate through the multiple paths originating from each of the links in the initial page. This interweaving of forward and backward movement through links is very tedious, time consuming, and often leads users to feeling lost.

These problems are to some degree addressed by interfaces that support multiple concurrent views of related information. Through the use of these multi-view techniques, a link is opened in a different window, pane, or frame rather than overwriting the contents of the current browser context. There are, however, limitations in these techniques as well. One interaction technique is to provide users the means to open linked content in a new window. In principle, users could easily switch to previously selected pages of information without needing to backtrack in order to explore other paths emanating from this page. But the problem with this approach is that no mechanism is provided to explicitly track the paths the user has explored. The set of open windows on the screen provides users the only basis for tracking the paths they have navigated from an initial link. However, the screen very quickly may become cluttered with the large number of windows a user needs to open, and users can easily lose the context of their exploration as they selectively close some of these windows.

Multi-frame interfaces provide an alternative technique to address the navigation problems posed by single view interfaces. In these approaches, a fixed set of areas known as frames are displayed within a single window; thus avoiding the proliferation of temporary windows on a screen. A link may be selected in one frame and opened in a different frame. In this way, users may explore multiple links contained within a single page without having to backtrack to the initial page. However, frames do not facilitate being able to easily explore a sequence of links from the first set of linked pages. For example, suppose a user selects a link from a page displayed in one frame. The linked page is now opened in a different frame. But if the user selects a link from this new page, it will either overwrite its content or open a new window. If the user wishes to explore other paths that originate from the first linked page, they will need to engage in the tedious backtracking process required by single view browsers or manually manage the proliferation of windows resulting from the multi-window technique.

Although multi-view interfaces help alleviate some of the navigation problems raised by single-view browsers, they provide users only limited support for navigating easily through multiple paths of linked information stored in an information base. These problems limit the utility of browsers as a tool for exploring inter-related concepts and information. Therefore, there is a need for an improved method and system that enable users to efficiently and easily navigate through multiple sequences of linked information stored in the an information base.

SUMMARY OF THE INVENTION

The present invention provides a system and method that solves the above-described problems in browser technology by enabling users to easily navigate through and switch between different paths within an information base. The system comprises a user interface, a display, and an information base source. A user can easily navigate through multiple paths of linked pages of information stored in the information base by displaying pages of information in multiple panels on a window on the display.

According to the invention, pages of information stored in the information base are displayed in multiple panels (panes or frames) on a window of the display. The information base consists of pages of information; each page of information is comprised of at least one form of information selected from the group of text, graphic, video, audio, and animation. Each page of information may contain one or more links to other pages of information in the information base.

A navigation panel, a preview panel, a history panel and an expert path panel are displayed. A first page of information, having data and links to other pages of information, is displayed in the navigation panel. A user may select a link being displayed in the navigation panel, and the system will display the selected page simultaneously in the preview panel. The user may indicate a replacement operation, which will cause the page in the navigation panel to be replaced with the page in the preview panel. The history panel displays symbols representing the pages that have previously been displayed in the navigation panel.

The system leverages multi-view browser technology to enable users to preview different possible paths emanating from a specific page of information prior to selecting a specific path to explore. Users preview a path by selecting a link in a page displayed in one panel of a window (navigation panel) and displaying the linked page in a different panel (preview panel). If users decide to explore the path that continues through the linked page, they replace the contents of the navigation panel with the linked page. Links originating from this first link can now be previewed in the preview panel and the path extended as users select subsequent links to transfer into the navigation panel. As a user incrementally extends the path that they are exploring, the system updates a history that displays the path that the user has thus far explored. The history is represented as a linear sequence of symbols, which taken together represent the users' linear progression through a specific sequence of linked pages of information. Users can interact with this history to easily return to a previously selected page of information within the path in order to follow other paths emanating from that page. As a user progresses through an alternative path, the history is updated to reflect the new path that the user is pursuing.

The system can also display prescribed paths that a user may follow through the information base. Each prescribed path, known as an expert path, is represented as a linear sequence of symbols, which taken together represent a prescribed sequence of pages of information that a user should visit. The system allows users to select each page of information in the prescribed order, skip any part of the prescribed path, or deviate from the path to explore alternative paths emanating from a specific page of information.

DETAILED DESCRIPTION OF THE INVENTION

The system and method of the present invention will be described by a particular implementation, called a Knowledge Crystal Browser, although it will be apparent to those skilled in the art that other implementations are possible. The Knowledge Crystal Browser is a specialized design based on multi-view browser technology.

Figure 1:
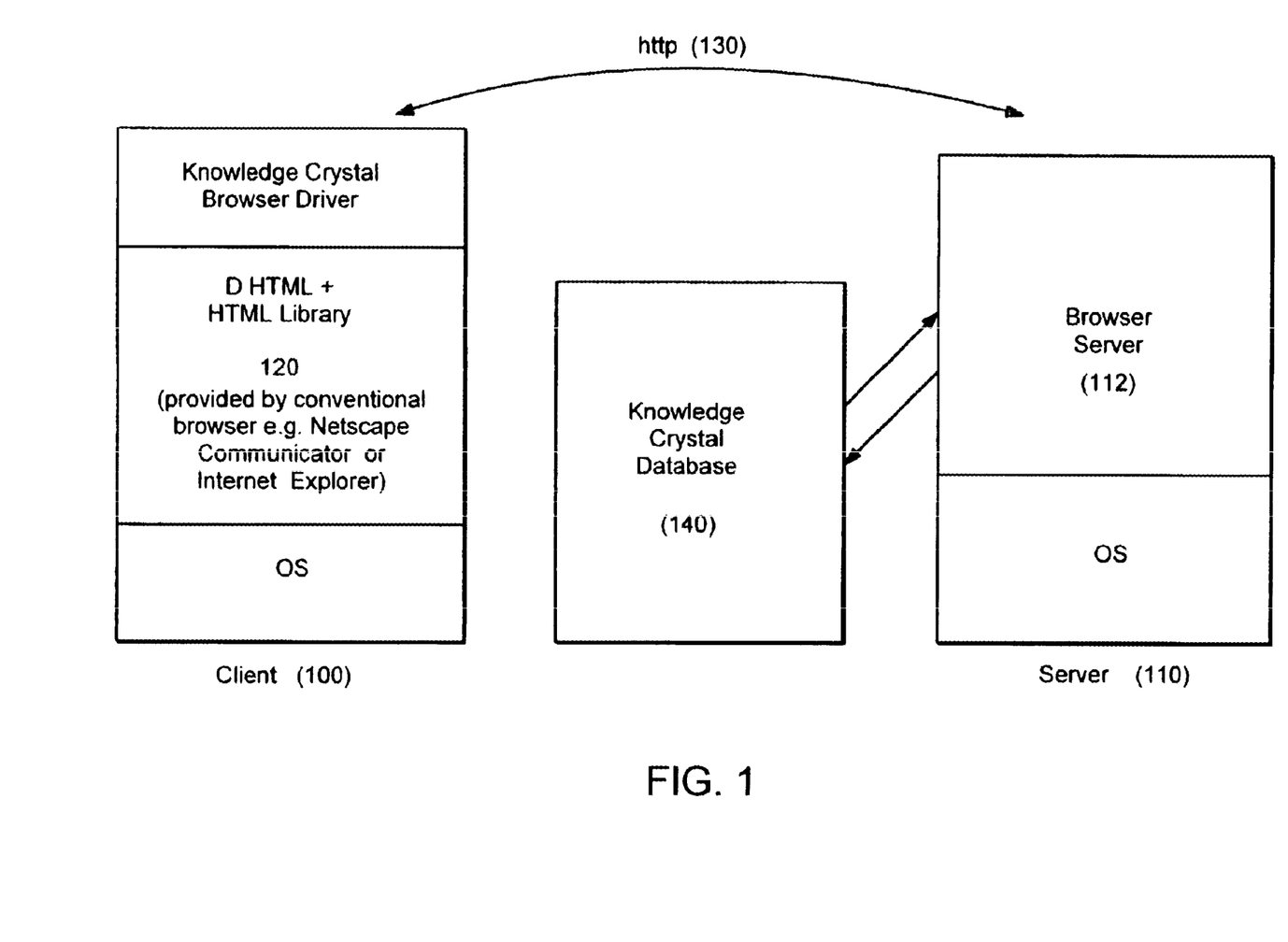
FIG. 1 is an illustration of the system of the present invention showing the Knowledge Crystal Browser implemented on a client computer and communicating with a server to process pages of multi-media pages of information.

Referring to FIG. 1, the Knowledge Crystal Browser is implemented on a client computer 100 such as a Personal Computer PC using HTML. A Knowledge Crystal Browser 102 is installed on the client 100 and communicates with a server 110 using a traditional browser 120 (e.g., Netscape Communicator or Internet Explorer) as an implementation platform. An HTML Library 104 on the client 100 is provided by the conventional browser. Like traditional browsers, the Knowledge Crystal Browser communicates with content servers through the http protocol, shown at 130.

The Knowledge Crystal Browser Server 112 accesses multi-media content (such as text, graphics, audio, video, and/or animation) represented as pages of information, which is stored in an information base called the Knowledge Crystal Database 140. Each page of information stored in the Knowledge Crystal Database 140 may contain one or more links to other pages of information in the information base.

Figure 2:
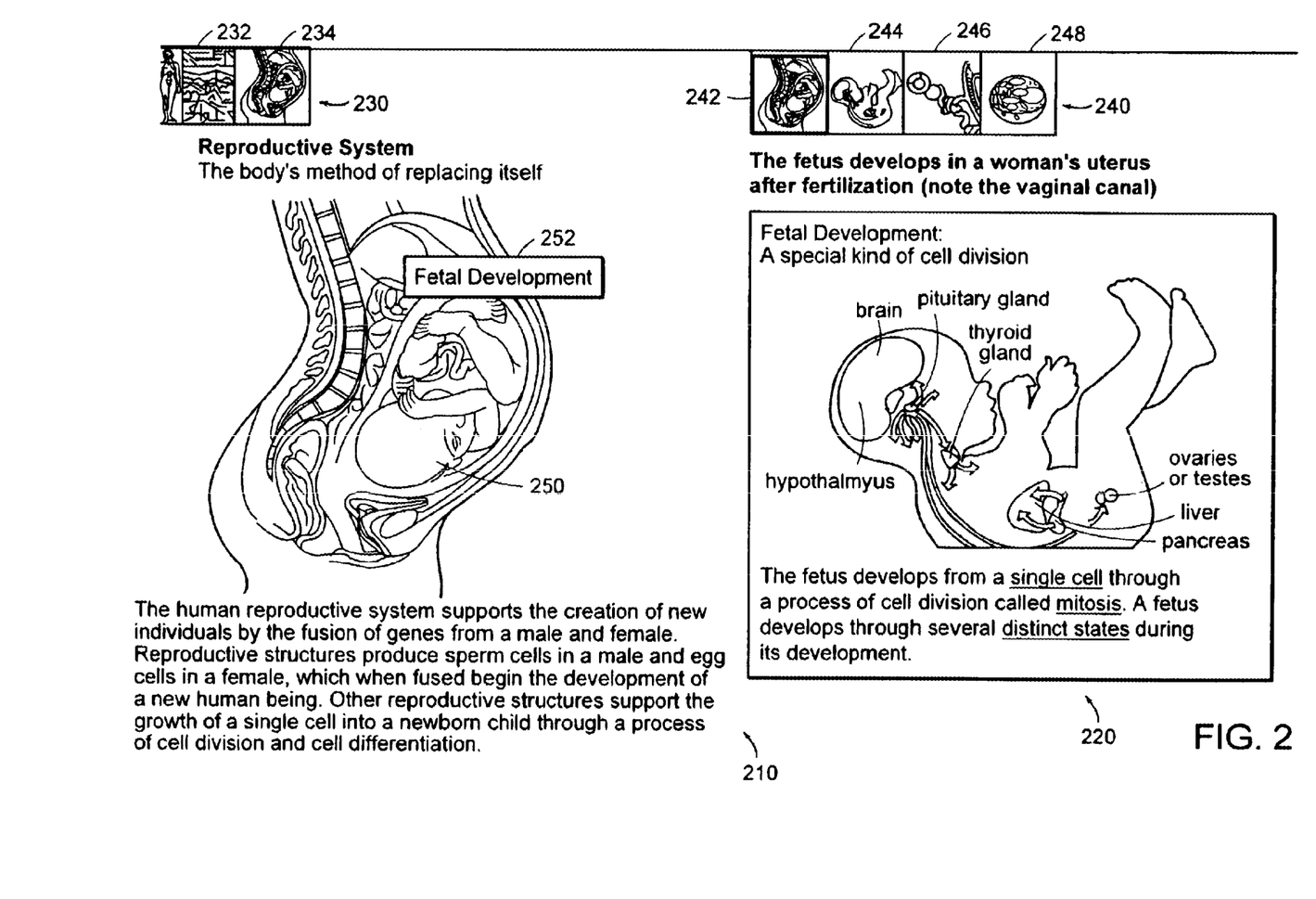
FIG. 2 shows the multi-view interface of the Knowledge Crystal Browser, having the navigation panel, preview panel, history panel, and expert path panel.

As shown in FIG. 2, the Knowledge Crystal Browser uses a multi-view interface that includes a navigation panel 210, a preview panel 220, a history panel 230, and an expert path panel 240. The history panel 230 as shown in FIG. 2 has two icons 232, 234 representing two previous pages of information that were displayed in the navigation panel. The expert path panel 240 shows four icons, 242, 244, 246, 248 in this example.

The navigation panel 210 displays a page of information titled "Reproductive System" 250 that may contain one or more links to other pages of information. Distinct information elements (e.g., a word or graphic element) on a page of information may represent a link to other pages of information. In addition, an information element may represent a link to multiple pages of information; each link being displayed as an item in a pop-up that is brought up by interacting with (e.g., hovering over) the information element. For example, by hovering over the "Fetal Development" graphic element 252, the corresponding page is displayed in the preview panel 220.

The Knowledge Crystal Browser provides users two different modes of interaction with a link in the navigation panel 210: preview mode and navigation mode. By interacting with a link through preview mode (e.g., by hovering over a link), a user will display a linked page in the preview pane 220. In preview mode, the initial page of information remains visible in the navigation pane. By interacting with a link in navigation mode (e.g., by mouse clicking on a link), a user replaces the contents of the navigation panel with the linked page. After the linked page is transferred into the navigation panel, links originating from this first link may now be interacted with in either preview or navigation mode.

Users may modify the size of the navigation panel 210 and preview panel 220 at any time while navigating through the Knowledge Crystal Database. The system will determine if the size of the navigation panel 210 is too small to adequately display the contents of the page of information displayed in the navigation panel. If the system determines that the navigation panel 210 is too small, the Knowledge Crystal Browser will display only the links to other pages of information contained in the page of information.

As a user navigates through a specific path of linked pages of information contained in the information base, the contents of the history panel 230 are updated. Unlike other history mechanisms employed by conventional browsers, the history panel 230 does not track all of the pages of information that a user has visited. Instead, the history panel 230 keeps track of the user's progress through a specific path. The history panel displays a linear sequence of symbols, each symbol representing a page of information which taken together reflect the user's linear progression through a specific sequence of linked pages of information. In FIG. 2, the history panel 230 has two icons 232, 234, although it could have any number of icons.

Each time a user replaces the content of the navigation panel 210 with a new page of information, the history panel 230 is updated with an icon, or symbol, representing that new page of information. Users can interact with this history to return to a previously selected page of information within the path in order to follow other paths emanating from that page. When a user returns to a previously selected page, the history is updated by deleting from the history all pages that followed the page that the user has returned to. When a user selects a link in navigation mode, replacing this page with a new page in the navigation panel; the history panel is updated to reflect the new path that the user is exploring.

The expert path panel 240 presents to users a prescribed sequence of pages of information through which a user should traverse, providing them an organized strategy to navigate through a large body of knowledge. As shown in FIG. 2, the expert path panel has four icons, 242, 244, 246, 248. The prescribed sequence is displayed as a sequence of symbols, each symbol representing a distinct page of information. Users traverse through the sequence by selecting each symbol in order or by requesting the browser to automatically display each page in order. Pages are displayed in the navigation panel 210. Users may skip any part of the prescribed path by skipping a page in the sequence. Users may also deviate from the path to explore alternative paths emanating from a specific page of information by interacting with links in a page displayed in the navigation panel. Users may interact with links in either preview or navigation mode.

Users may exit from the Knowledge Crystal Browser, saving their current location and the current path stored in the history pane. In this way, users may return to the Knowledge Crystal Browser at a subsequent occasion, retrieving the state in which they left their exploration through a body of knowledge and their history and proceed as if they were uninterrupted. Users may also email to other users their current state and history. When other users enter a Knowledge Crystal Browser with this state and history information, they can either follow the same path as the other user or bring up the view the other user sent to them.

Description of the Invention Using a First Example

Although the above described invention is entirely enabling of the invention generally and of this embodiment in particular for a practitioner ordinarily skilled in the arts, as an aid to more quickly understanding the invention, it is useful to consider in detail an example that includes a small subset of the invention and which is therefore simple to describe and easy to understand.

Figure 3:
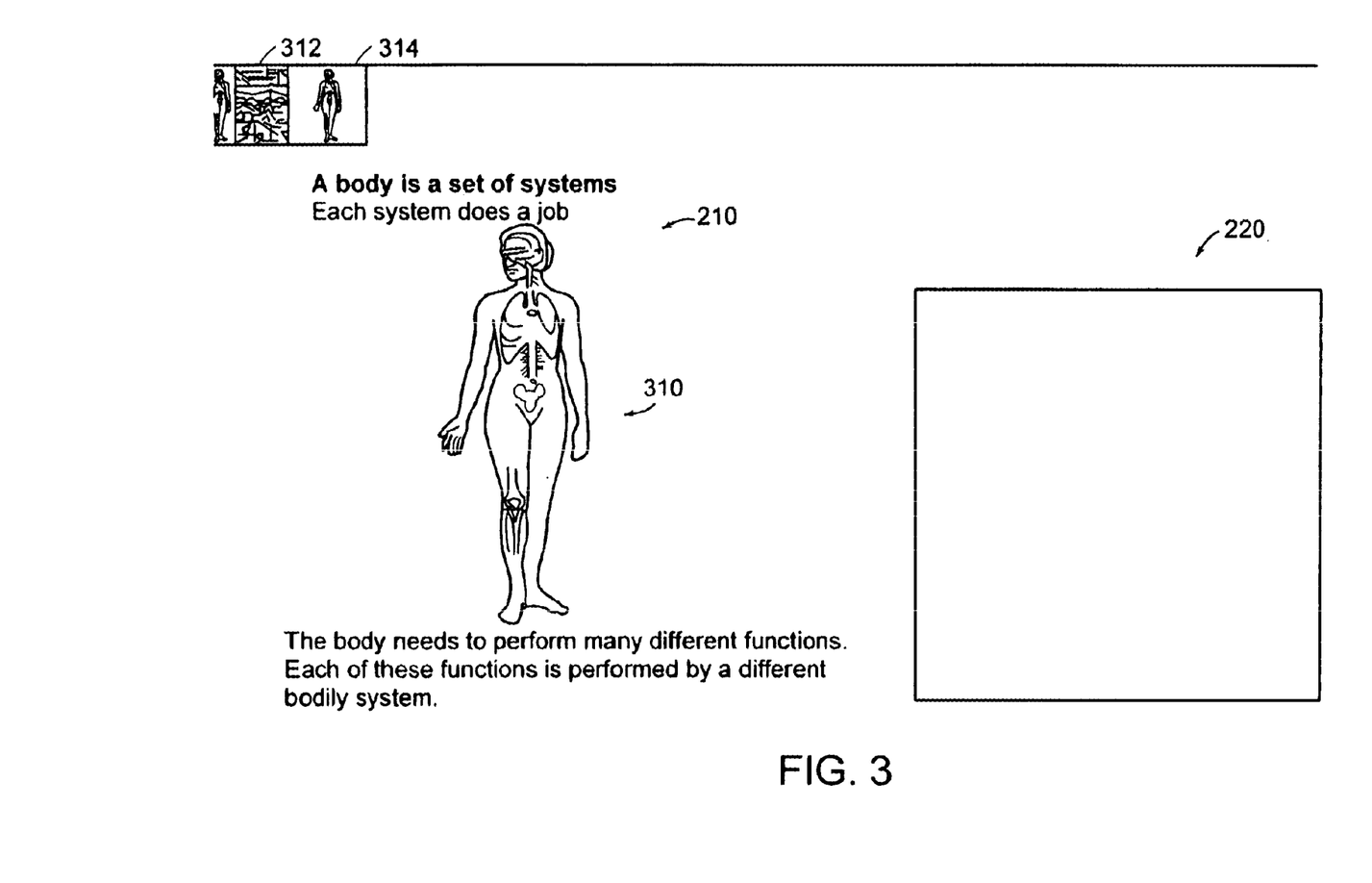
FIG. 3 shows an initial picture of the human body as displayed in the navigation panel.
Figure 4:
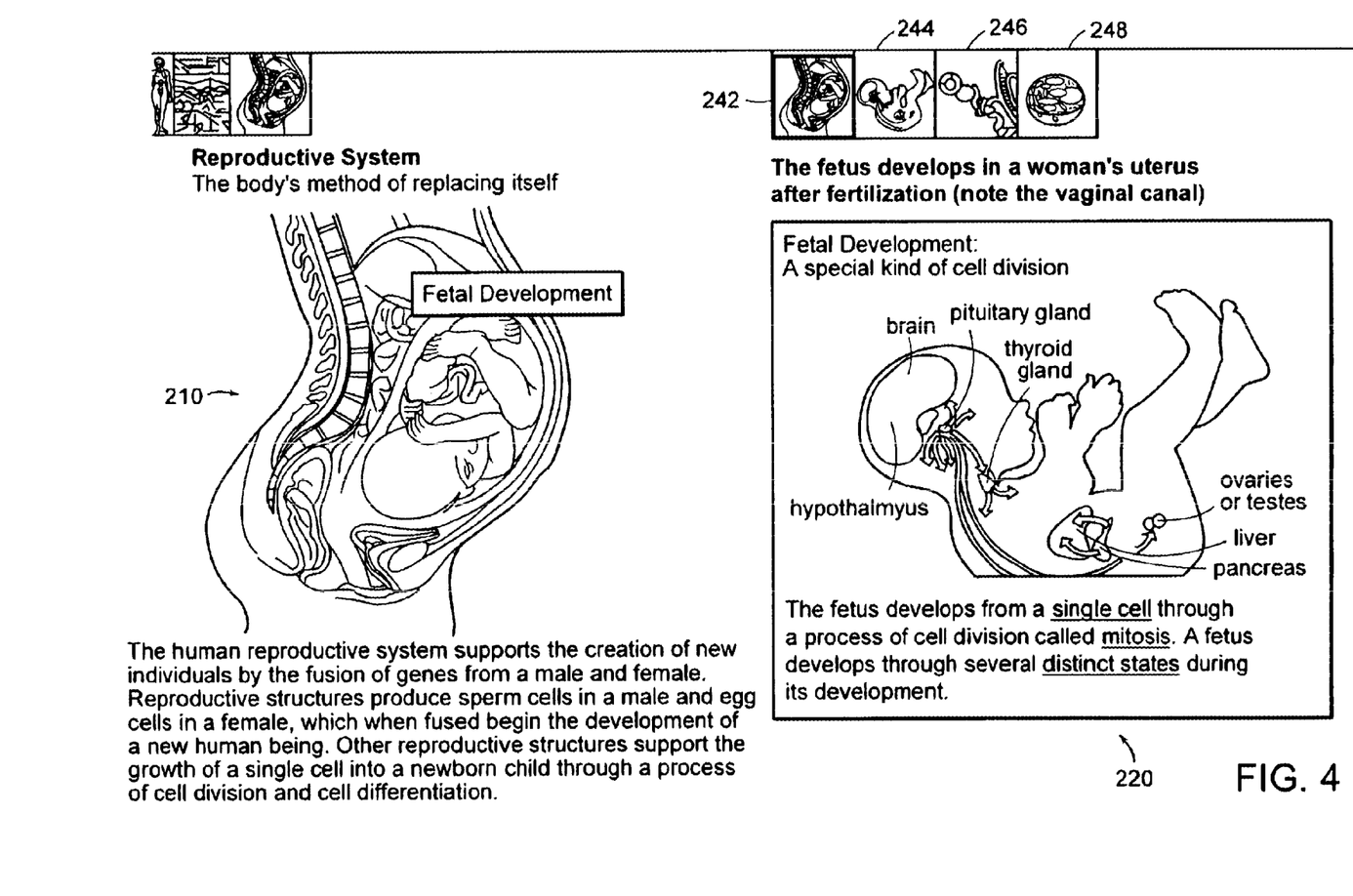
FIG. 4 displays a human reproductive system in the multi-view interface of the Knowledge Crystal Browser.

As shown in FIGS. 2 through 4, the following example illustrates the use of a Knowledge Crystal Browser to access concepts and information regarding the human body. This embodiment will include only several features of the above-described invention. In this embodiment, a user is using the knowledge browser to explore information about the human body.

FIG. 3 shows an initial picture of the human body 310 is displayed in the navigation panel 210. As shown in FIG. 3, two icons 312, 314 are in the history panel. The preview panel 220 and the expert path panel 240 are empty.

According to this example, as a user scans over the human body in preview mode, different body parts serve as links, displaying information about that body part in the preview panel 220. For example, if a user hovered over the heart, a page would be displayed in the preview panel containing a graphic that represented the different parts of the circulatory system: the heart, the arteries (displayed in red), the vein (displayed in blue), and the capillaries (displayed in the fingertips). If the user wanted to see further detailed information about a specific system, the user would click a mouse button while hovering over the icon representing that physiological system. For example, if the user wanted to see more detailed information about the circulatory system, the user would click the mouse button while hovering over the heart. Doing so would bring the graphic on the circulatory system into the navigation panel.

As the user scanned over different parts of the circulatory system in the navigation panel, graphics representing the corresponding parts of the circulatory system would be shown in the preview panel. For example, as the user scanned over blue lines representing the veins, a detailed picture of a vein would be displayed in the preview panel together with a description of the vein's function. If the user wanted more detailed information about a vein, they would then click a mouse button. The graphic representing a detailed view of a vein would then displayed in the navigation panel. A user could then scan over the parts of the vein and display more detailed views of each part of the vein in the preview panel.

The history panel maintains the history of pages of information displayed in the navigation panel. In the preceding example, the history panel would display a sequence of three symbols: (1) an icon representing the page with the human body; (2) an icon representing the circulatory system outlined in the body; and (3) an icon representing a vein. A user would return to a previous page of information by hovering over the corresponding icon in the history pane and clicking the mouse button. For example, after the user had finished exploring detailed information regarding the vein, the user would return to the page on the circulatory system by selecting its corresponding icon in the history panel. That would bring that page up in the navigation panel. The user could then choose to explore information about arteries, pursuing the path that begins with a link to information about the artery.

FIG. 4 illustrates an expert path panel 240 in the upper right hand portion of the window. In this example, an expert path panel 240 is used to present a prescribed sequence of pages of information through which a student should traverse to learn about a particular topic in biology. This expert path in this example consists of four icons 242, 244, 246, 248. Each icon represents a different page of information, each providing students increasingly detailed information about the reproductive system. For example, the first icon 242 represents a page that provides students detailed information about the physical structure of the human reproductive system. The second icon 244 represents a page that provides students information about fetal development; the third 246 about cell division; and the fourth 248 about the structure of the cell. Students use the expert path by accessing each of these icons in order. Students access page from the expert path 240 by clicking a mouse button while hovering over the designated icon. For example, by hovering over the icon of a fetus, the student displays a page representing fetal development. After the student has completed exploring content associated with this page, they then select the next icon in the expert path. This process continues until the student has selected each of the icons in order.

Description of the Invention Using a Second Example

The second example of the preferred embodiment of the invention illustrates additional features that were not illustrated in the first embodiment. In particular, this example will illustrate how the same information element on a page may represent several different links, each identified as an item in a pop-up menu.

Figure 5:
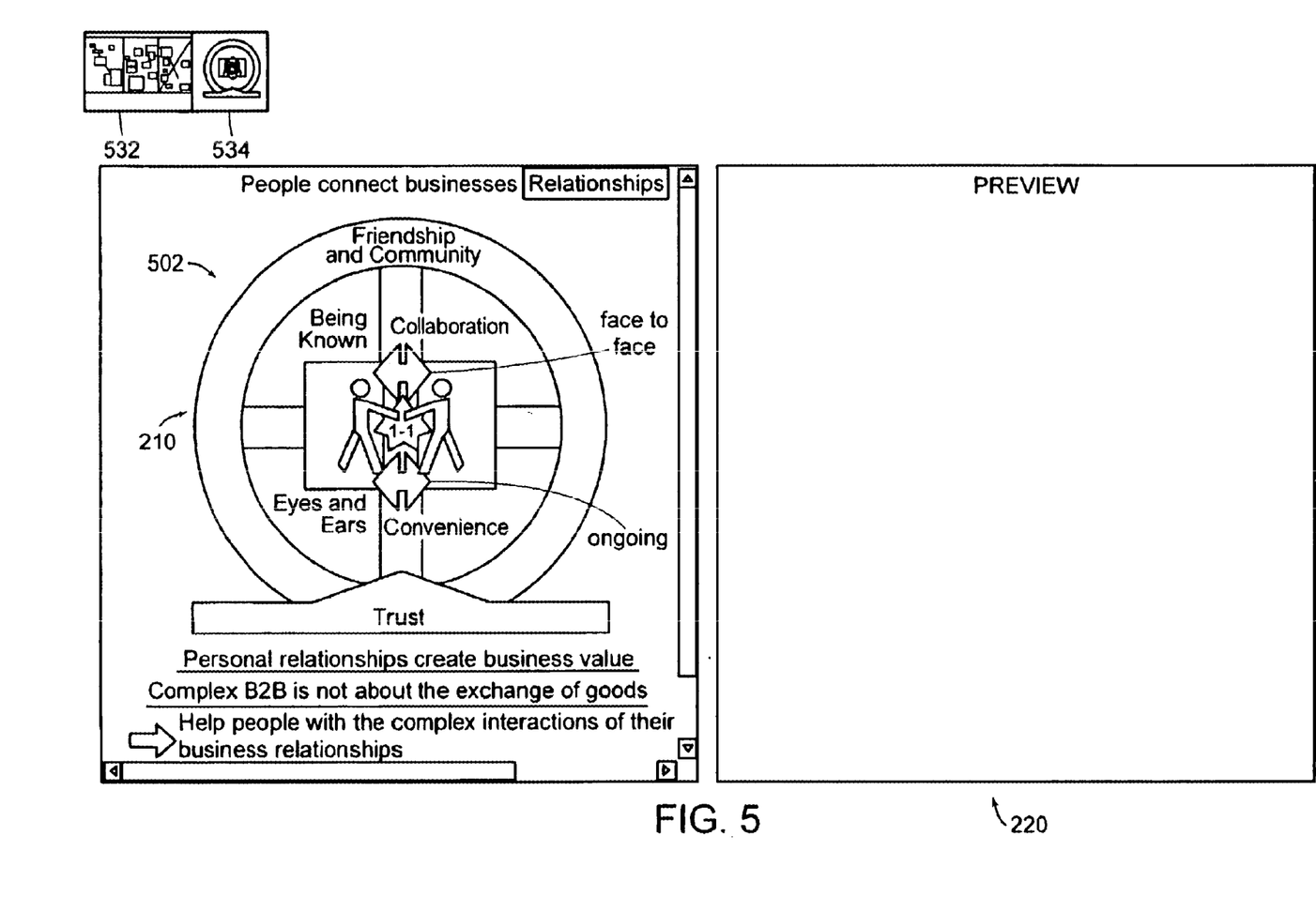
FIG. 5 shows a second example, illustrating how the present invention is used to access concepts and information pertaining to business-to-business relationships.

As shown in FIG. 5, this example shows the Knowledge Crystal Browser used to access concepts and information pertaining to business-to-business relationships. FIG. 5 illustrates a graphic 502 shown in navigation panel 210 that highlights key concepts related to the role of interpersonal relationships in business relationships. For example, the graphic highlights four aspects of interpersonal relationships in business: Being Known; Eyes and Ears; Collaboration; and Convenience. As users hover over each aspect (e.g., "Eyes and Ears") a menu pops-up that provide different content that expand on that same aspect of interpersonal relationships in business. The history panel 230 is shown in the upper left corner of the display screen having two history icon 532, 534. The preview panel 220 is blank, and the expert path panel 240 is blank.

Figure 6:
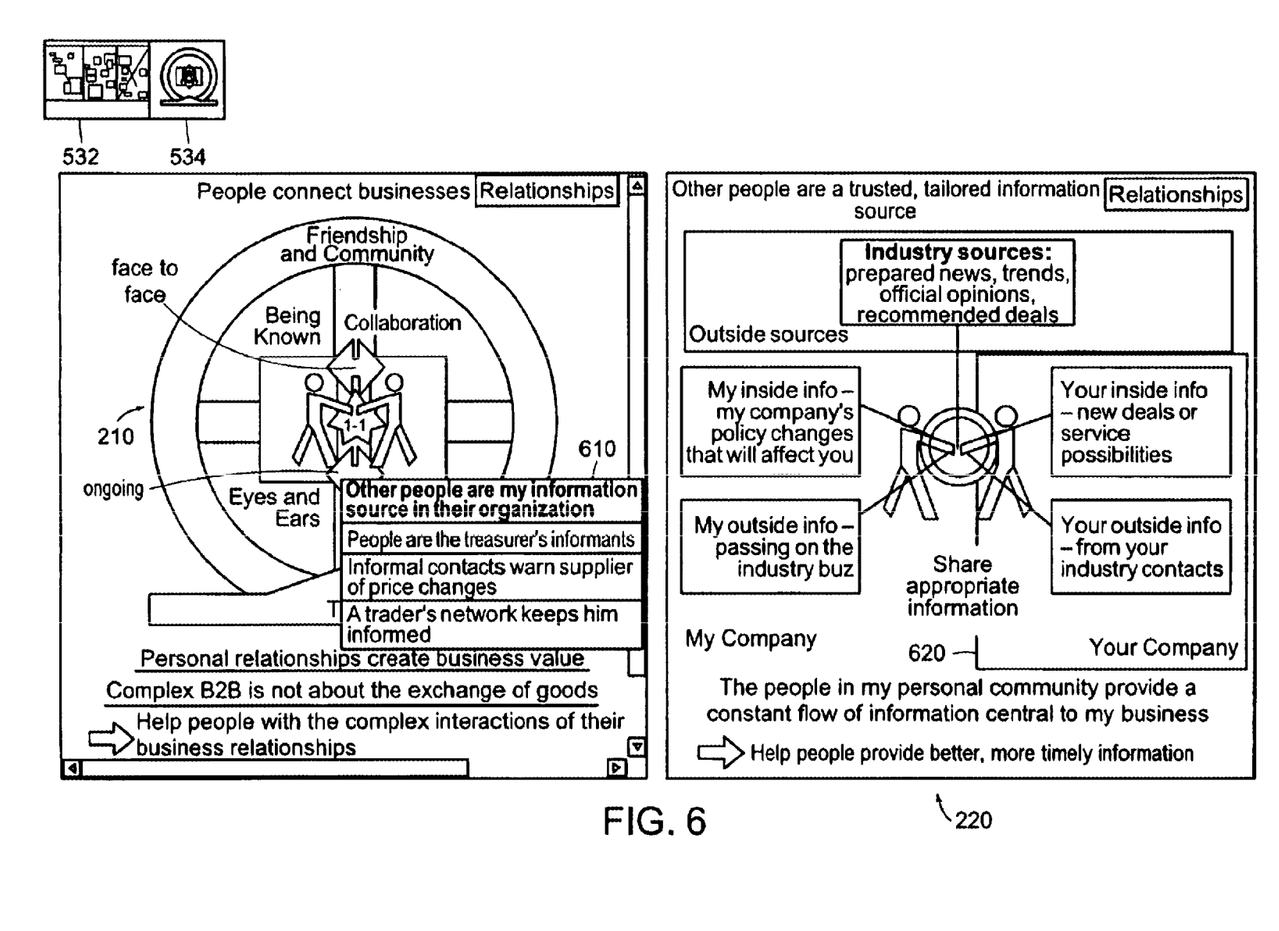
FIG. 6 shows that when the user hovers over "Eyes and Ears", a menu pops-up that includes four items.

FIG. 6 illustrates the display screen after the user hovers over "Eyes and Ears". A menu 610 pops-up that includes four items. The navigation panel 210 still shows the graphic 502 that was shown in FIG. 5. Each item expands on the theme "Eyes and Ears" in a different way. Users may hover over each menu item to see the content 620 associated with each menu choice in the preview panel 220. History panel 230 still has only two icons 532 and 534 because the user has not selected a page to replace the current page in the navigation panel 210.

Figure 7:
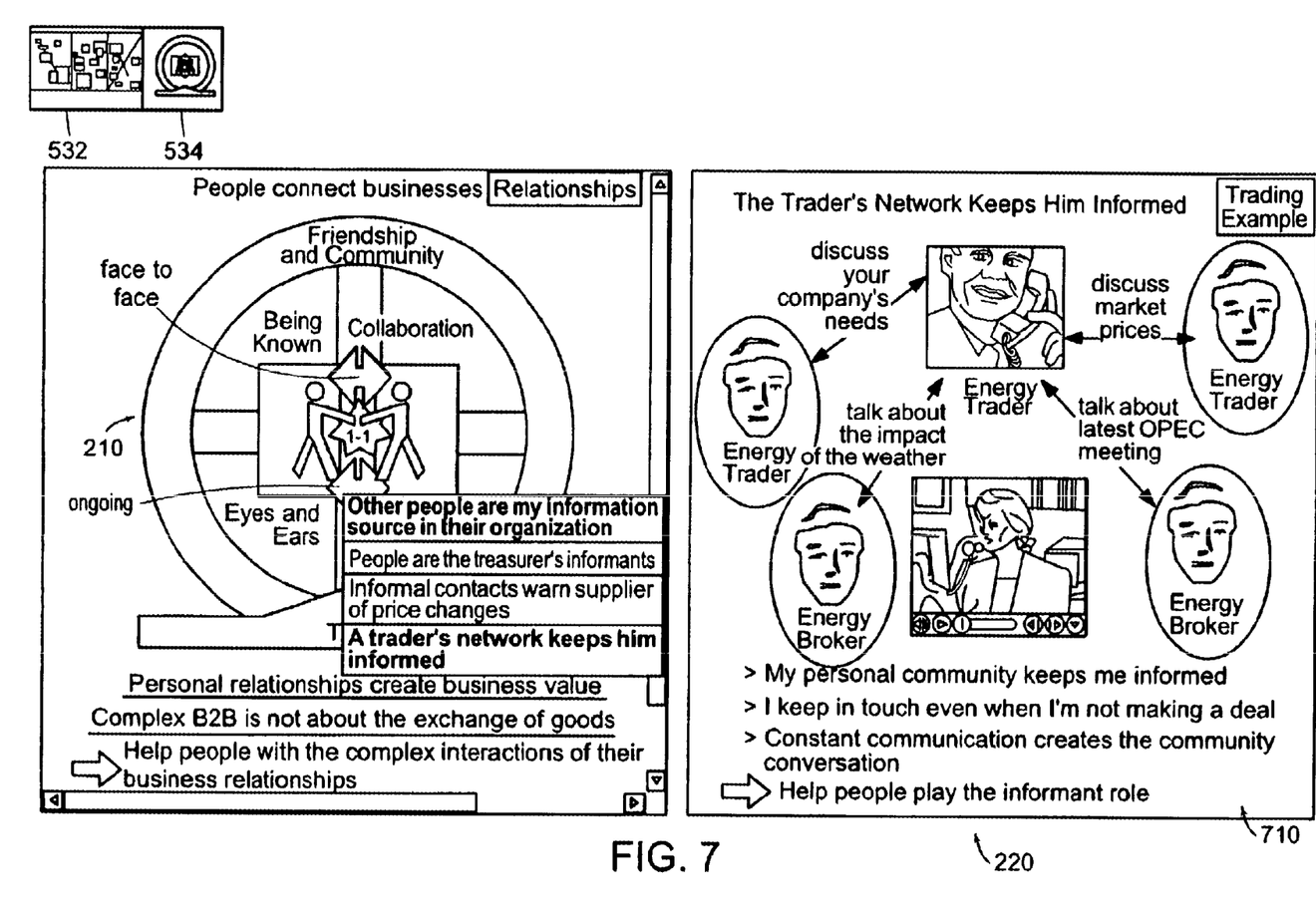
FIG. 7 shows the user hovering over the menu choice "A trader's network keeps him informed" in the navigation panel and sees content in the preview panel that show the various ways a network of personal relationships keeps a trader informed about information relevant to his business dealings.

FIG. 7 shows the user hovering over the menu choice "A trader's network keeps him informed" in the navigation panel 210 and sees content 710 in the preview panel 220 that show the various ways a network of personal relationships keeps a trader informed about information relevant to his business dealings. If a user wants to see additional information regarding this topic, the user will click on a mouse button while hovering over this menu choice and the content of the preview panel 220 will move over in the navigation panel 210.

Figure 8:
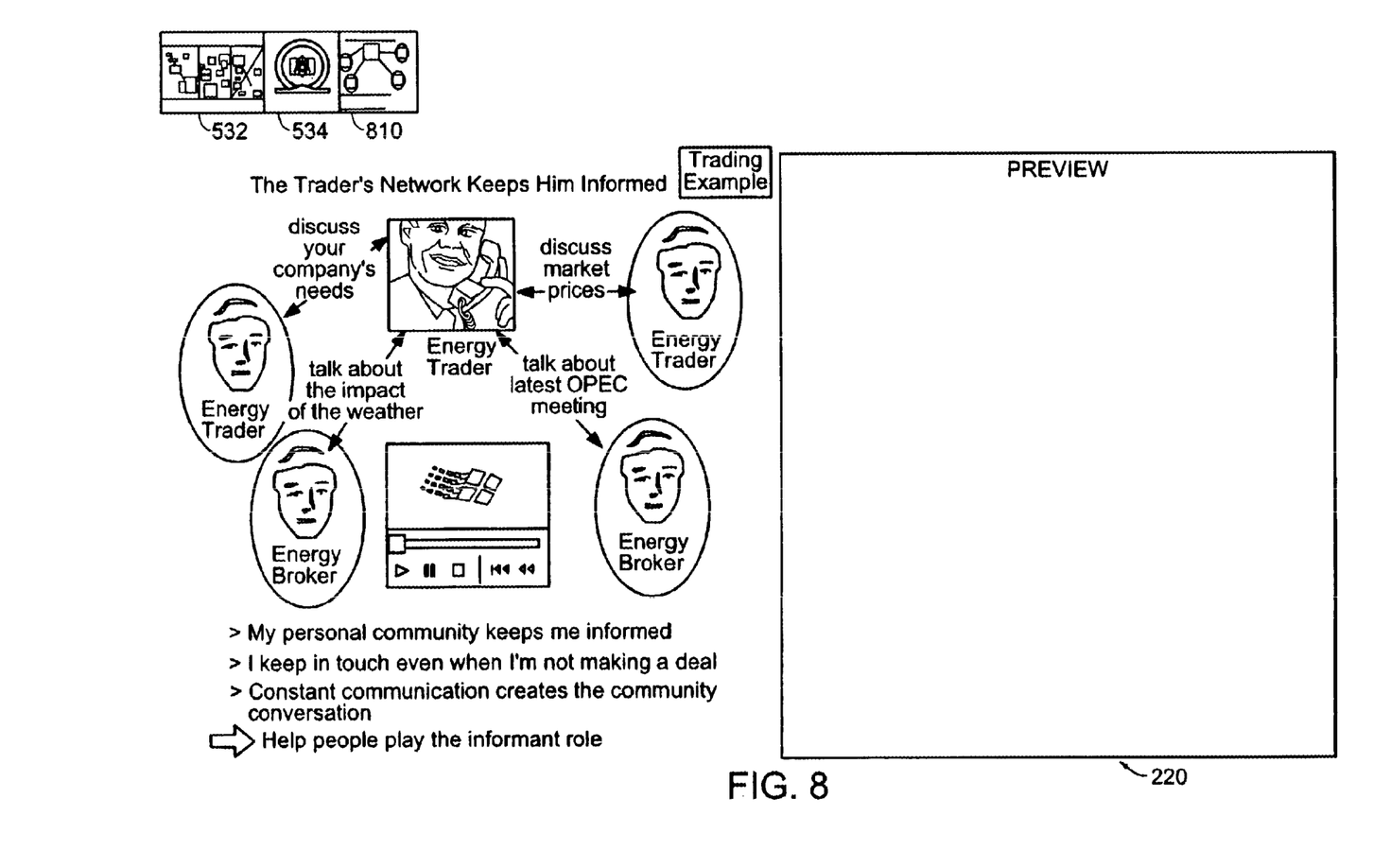
FIG. 8 shows that the history panel consists of three icons after the content of the new page of information is transferred to the navigation panel.

As in the previous example, as the user transfers each page of information, the content of the history panel 230 is updated to reflect the additional page of information. As seen in FIG. 8, after the content of the new page of information is transferred from the preview panel 220 to the navigation panel 210, the history panel now consists of three icons 532, 534 and 810. If the user now wants to return to the first page of information and select a different menu item, he can do so by hovering over the icon in the history panel representing the first of page of information 532 and clicking a mouse button to select it. This action results in displaying the first page of information again in the navigation panel 210. The user may now bring up the same menu they brought up before by hovering over "Eyes and Ears" or bring up a different menu by hovering over other elements of this page. The user may now bring another page into the navigation panel by selecting a new menu item from any of the menus to bring up in the navigation panel.

Figure 9:
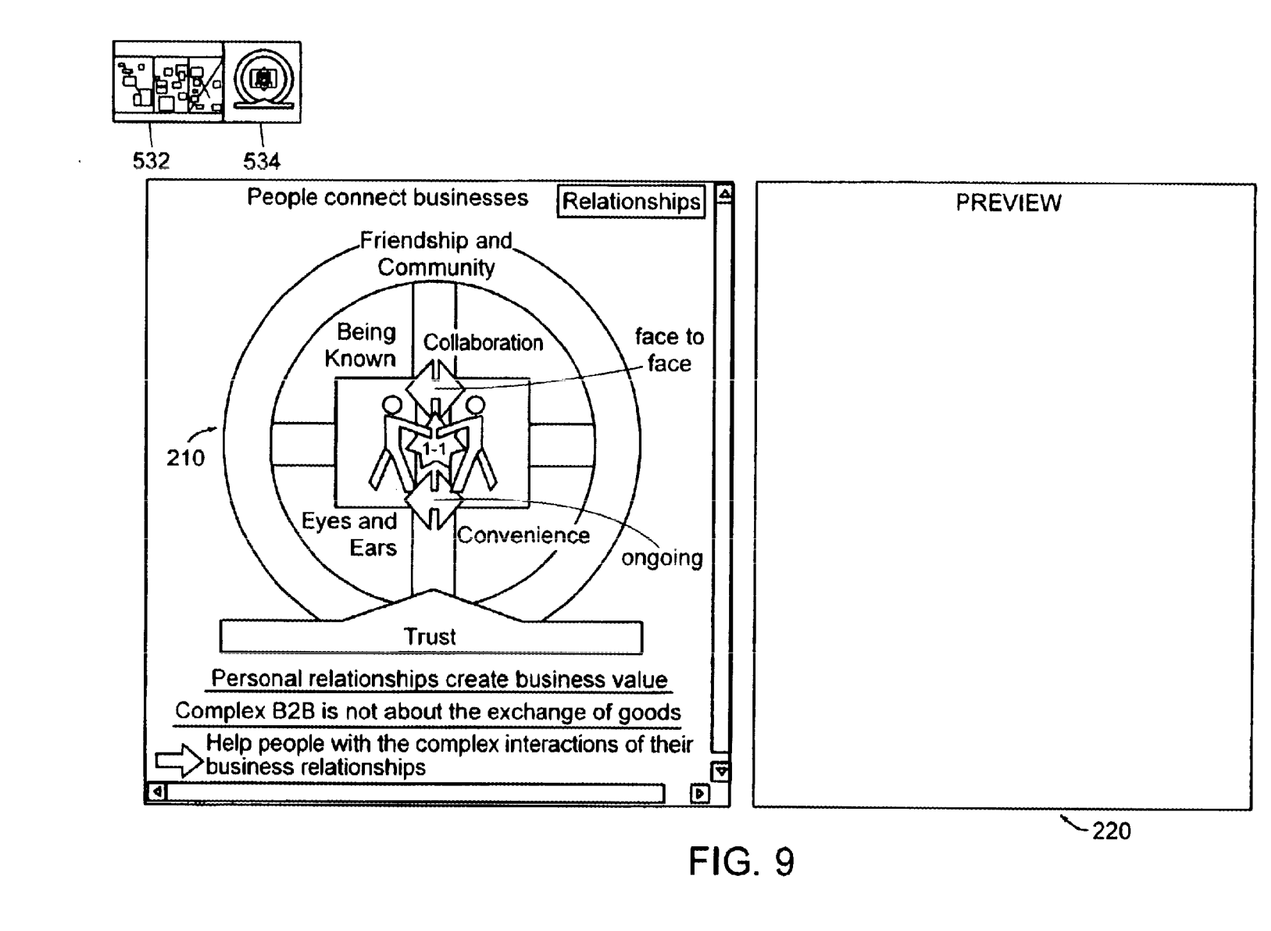
FIG. 9 shows how the history panel displays only the specific path the user is exploring from a top-level page.

Referring to FIG. 9, the history panel 230 is shown after the user has returned to the graphic 502 that was shown in FIG. 5. Unlike history mechanisms for traditional browsers, the history panel 230 only displays the specific path the user is exploring from a top-level page. As in this example, when the user backtracks from one path and returns to a previously viewed page, they may pursue a new path. For example, when the user returns to the page displaying aspects of personal relationships in business, the history panel 230 is updated back to two icons 532 and 534 representing this page and an initial index page. This shows that they have backtracked from the path they were pursuing. They may now further explore this page and select a new path. For example, the user may hover over the element "Collaboration" and select that path.

Figure 10:
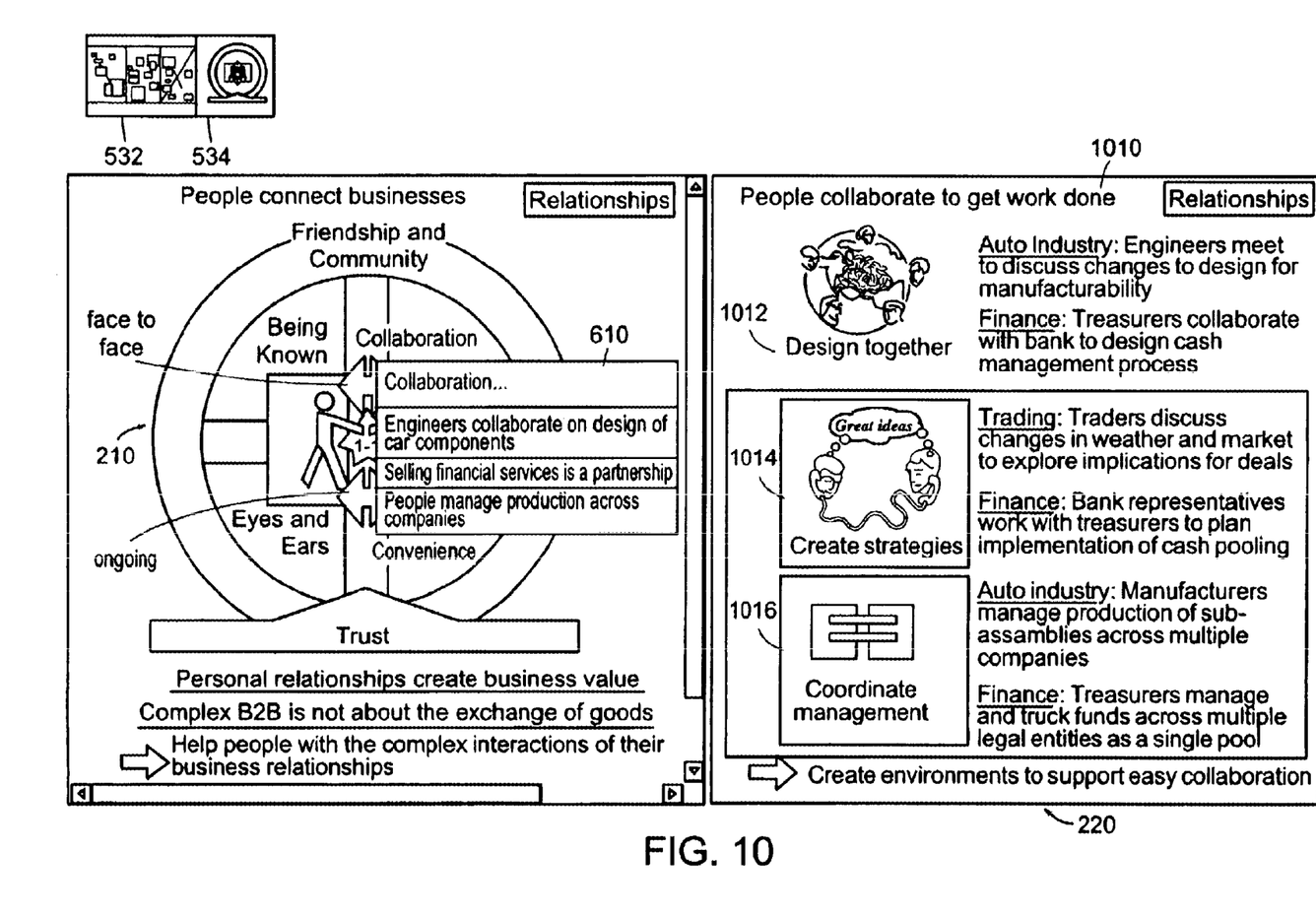
FIG. 10 shows the menu choices that pop-up after a user hovers over an element of the page of FIG. 9.

FIG. 10 shows the drop-down menu 610 and the menu choices that pop-up in preview panel 220 after a user hovers over the "Collaboration" element of the page. Navigation panel 210 and history panel 230 have the same display shown in FIG. 9 because the "Collaboration" page has not yet been selected. The preview panel 220 has the graphic, "People Collaborate to get work done" 1010 displayed. This graphic 1010 has displayed several menu choices, including "Design together" 1012, "Create strategies" 1014, and "Coordinate management" 1016.

Figure 11:
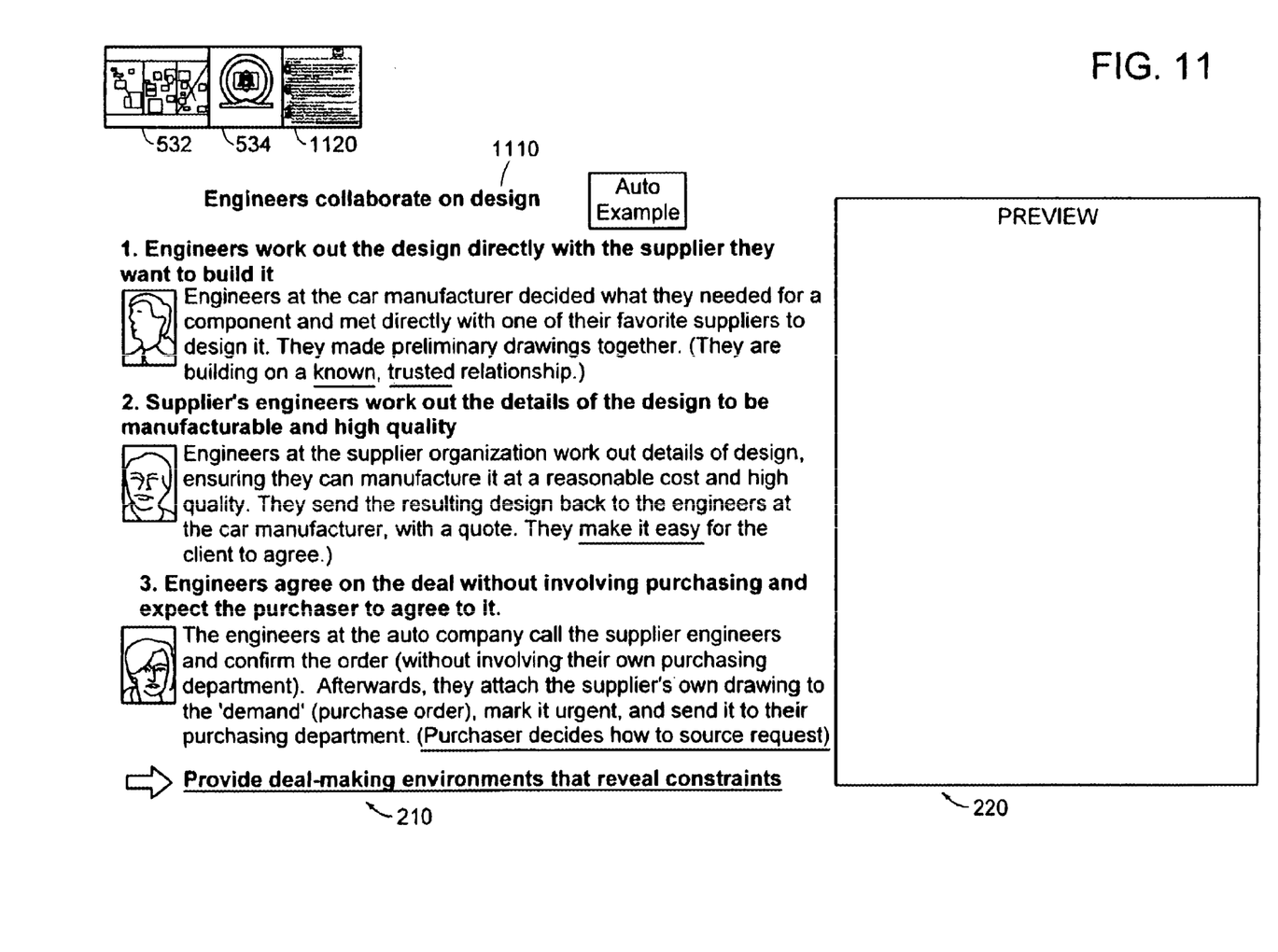
FIG. 11 illustrates the results of the user selecting one of the menu choices of FIG. 10.

FIG. 11 shows the results of the user selecting the menu choice "Design together" 1010. A new page titled "Engineers collaborate on design" 1110 is now displayed in the navigation panel 210. The history panel 230 is also updated to again show three icons 532, 534 and 1120, reflecting the new path that the user has selected to explore. Preview panel 220 is now empty as it was copied into the navigation panel 210.

I claim:

1. In a computer system having a user interface, a display, and an information base source, a method for easily navigating through multiple paths of linked pages of information stored in the information base by displaying pages of information in a window on the display, the window having multiple panels, comprising the steps of:

displaying a navigation panel within a first panel of the window, the navigation panel comprising an area for displaying a first page of information, wherein the first page of information contains data and links to other pages of information;

selecting a link being displayed in the navigation panel, the link providing an address to a second page of information;

retrieving the second page of information corresponding to the selected link;

displaying a preview panel within a second panel of the window;

displaying the second page of information in the preview panel;

receiving replacement user input indicating a replacement operation;

displaying the second page of information in the navigation panel if the user input indicated to perform the replacement operation.

2. The method of claim 1 wherein the second page of information does not contain a link to an information page.

3. The method of claim 1 wherein the second page of information contains a link to an information page, and after receiving user input indicating a replacement operation, the second page replaces the first information page in the navigation panel, and a user may select a link in the second page of information for display in the preview panel.

4. The method of claim 1, further comprising the steps of:

displaying a third, history panel within the window; and displaying history symbols in the history panel, wherein each history symbol is representative of a page of information that has previously been displayed in the navigation panel and the display order of the history symbols corresponds to the display order of the pages that were displayed in the navigation panel.

5. The method of claim 4, further comprising the steps of:

receiving history symbol user input corresponding a selected history symbol in the history panel; and displaying the page of information that corresponds to the selected history symbol.

6. The method of claim 5, further comprising the steps of:

deleting all the history symbols that are displayed after the selected history symbol;

receiving replacement user input indicating a replacement operation;

displaying a new page of information in the navigation panel if the user input indicated to perform the replacement operation; and adding a history symbol representative of the new page of information displayed in the navigation panel after the selected history symbol.

7. The method of claim 1, further comprising the steps of:

displaying a fourth, expert path panel in the window;

displaying expert symbols in the expert path panel, each expert symbol representing a page of information;

receiving expert symbol user input corresponding to a selected expert symbol in the expert path panel;

displaying in the navigation panel the page of information that corresponds to the selected expert symbol.

8. The method of claim 1, further comprising:

providing a user resizing operation with the user interface to allow resizing of the navigation panel and the preview panel of the display window.

9. The method of claim 8, further comprising:

determining whether the size of the navigation panel is too small to adequately display the first page of information to be displayed in the navigation page; and displaying only the links to other pages of information that are contained in the first page of information if the size of the navigation panel is determined to be too small.

10. The method of claim 1 wherein a link in the page of information displayed in the navigation panel is represented by a graphic element.

11. The method of claim 1 wherein a link in the page of information displayed in the navigation panel is represented by one or more contiguous words.

12. The method of claim 1 wherein a link in the page of information displayed in the navigation panel is represented by an item in a pop-up menu.

13. The method of claim 12 wherein the pop-up menu is displayed on the display after receiving user input selecting the pop-up menu.

14. A computer system comprising:

a source of pages of information, each page having an address, wherein a page may also contain a link to a different page of information;

a display device for displaying within a window a first page of information within a first, navigation panel and a second page of information within a second, preview panel;

means for obtaining pages of information from the source of pages, each page located at an address specified by a corresponding link;

means for replacing the first page of information being displayed in the first navigation panel with the second page of information being displayed in the preview panel.

15. The system of claim 14 wherein a page of information further comprises at least one form of information selected from the group of audio, text, graphic, video, and animation.

16. The system of claim 14, further comprising:

means for displaying history symbols within a third, history panel within the window on the display device, wherein each page that was displayed in the navigation panel has an associated symbol displayed in the history panel, the symbol comprising a link to the corresponding page address; and means for displaying a page of information that corresponds to a history symbol that is selected by a user.

17. The system of claim 14, further comprising:

means for displaying expert path symbols within a fourth, expert path panel within the window on the display device, wherein each expert path symbol contains a link to a page of information; and means for displaying a page of information that corresponds to an expert page symbol that is selected by a user.

18. The system of claim 14, further comprising means for resizing the size of the navigation and preview panels.

19. The system of claim 18 further comprising:

means for determining whether the size of the navigation panel is large enough to adequately display a page of information selected for display in the navigation panel; and means for displaying a list of links contained in a page of information in the navigation panel if the determining means determines that the size of the navigation panel is not large enough to adequately display the page of information.

\* \* \* \* \*